United States Patent
Parekh et al.

(10) Patent No.: US 12,244,672 B2
(45) Date of Patent: Mar. 4, 2025

(54) CLOUD DATA INGESTION SYSTEM

(71) Applicant: Capital One Services, LLC, McLean, VA (US)

(72) Inventors: Prashant Parekh, McLean, VA (US); Ramesh Chandra, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 197 days.

(21) Appl. No.: 17/450,335

(22) Filed: Oct. 8, 2021

(65) Prior Publication Data

US 2023/0114321 A1 Apr. 13, 2023

(51) Int. Cl.
| | |
|---|---|
| G06F 9/455 | (2018.01) |
| H04L 41/00 | (2022.01) |
| H04L 41/08 | (2022.01) |
| H04L 41/40 | (2022.01) |
| H04L 67/00 | (2022.01) |

(52) U.S. Cl.
CPC .......... H04L 67/34 (2013.01); G06F 9/45558 (2013.01); H04L 41/08 (2013.01); H04L 41/20 (2013.01); H04L 41/40 (2022.05)

(58) Field of Classification Search
CPC ......... H04L 67/34; H04L 41/08; H04L 41/20; H04L 41/40; G06F 16/25
See application file for complete search history.

(56) References Cited

U.S. PATENT DOCUMENTS

| | | | |
|---|---|---|---|
| 10,810,055 B1* | 10/2020 | Walker | G06F 16/2358 |
| 2006/0004832 A1* | 1/2006 | Langsford | G06Q 10/06 707/999.102 |
| 2007/0100712 A1* | 5/2007 | Kilpatrick | G06Q 10/06 705/29 |
| 2007/0100892 A1* | 5/2007 | Kephart | G06Q 10/06 |
| 2011/0012902 A1* | 1/2011 | Rajagopalan | G06F 11/32 707/E17.012 |
| 2012/0096163 A1* | 4/2012 | Tai | G06F 16/27 709/226 |
| 2017/0093639 A1* | 3/2017 | Dabbagh | H04L 41/12 |
| 2017/0214588 A1* | 7/2017 | Murthy | H04L 43/0876 |
| 2018/0011741 A1* | 1/2018 | Jayanthi | G06F 9/5072 |
| 2018/0146049 A1* | 5/2018 | Africa | H04L 41/08 |
| 2018/0262410 A1* | 9/2018 | Chou | H04L 41/40 |

(Continued)

*Primary Examiner* — William G Trost, IV
*Assistant Examiner* — Adam A Cooney
(74) *Attorney, Agent, or Firm* — DLA PIPER LLP (US)

(57) ABSTRACT

A computing system identifies a plurality of virtualization elements executing on a cloud computing environment. The computing system retrieves a first set of data related to software resources executing across the plurality of virtualization elements. The computing system retrieves a second set of data related to hardware resources associated with the plurality of virtualization elements. The computing system retrieves delta updates to the first set of data, wherein the delta updates are retrieved in real-time. The computing system generates a first database. The first database includes the first set of data related to the software resources, the second set of data related to the hardware resources associated with the plurality of virtualization elements, and the delta updates. The computing system generates a configuration management database hosted by a configuration management database system.

20 Claims, 5 Drawing Sheets

(56) References Cited

U.S. PATENT DOCUMENTS

| | | | |
|---|---|---|---|
| 2019/0102477 A1* | 4/2019 | Mayers | G06F 16/2282 |
| 2020/0233870 A1* | 7/2020 | Goyal | G06F 16/2282 |
| 2020/0314191 A1* | 10/2020 | Madhavan | H04L 41/0853 |
| 2020/0336378 A1* | 10/2020 | De Peuter | H04L 41/12 |
| 2020/0403862 A1* | 12/2020 | Erblat | H04L 67/10 |
| 2021/0075704 A1* | 3/2021 | Chan | H04L 43/065 |
| 2021/0168150 A1* | 6/2021 | Ross | G06F 16/9024 |
| 2022/0207151 A1* | 6/2022 | Gupta | G06F 8/60 |

\* cited by examiner

CLOUD DATA INGESTION SYSTEM

FIELD OF THE DISCLOSURE

Embodiments disclosed herein generally relate to a cloud data ingestion system for enterprise systems and a method of operating the same.

BACKGROUND

As cloud computing technology continues to improve and the cost of hosting applications on the cloud continues to become more affordable, companies are increasingly moving their services or software openings to the cloud. In order to effectively manage their cloud computing resources, clients need accessed to fine-grained information that describes the various hardware and software resources associated with their service offerings.

SUMMARY

In some embodiments, a method is described herein. A computing system identifies a plurality of virtualization elements executing on a cloud computing environment. The computing system retrieves a first set of data related to software resources executing across the plurality of virtualization elements. The computing system retrieves a second set of data related to hardware resources associated with the plurality of virtualization elements. The computing system retrieves delta updates to the first set of data, wherein the delta updates are retrieved in real-time. The computing system generates a first database. The first database includes the first set of data related to the software resources, the second set of data related to the hardware resources associated with the plurality of virtualization elements, and the delta updates. The computing system generates a configuration management database hosted by a configuration management database system to present information associated with the first database by causing a representation of the first database to exist within the configuration management database system and causing the representation to be translated into a configuration management database format compatible with the configuration management database system.

In some embodiments, the method further includes the computing interfacing with one or more streaming data platforms to present the information associated with the first database to one or more end users.

In some embodiments, the computing system interfacing with the configuration management database system to present information associated with the first database includes the computing system establishing a connection between the computing system and the configuration management database system via a Java database connectivity (JDBC) connection.

In some embodiments, the computing system retrieving the first set of data related to software resources executing across the plurality of virtualization elements includes periodically pulling software package data from the software resources executing across the plurality of virtualization elements.

In some embodiments, generating, by the computing system, the first database includes filtering the first set of data related to the software resources to include information requested by a user.

In some embodiments, the computing system retrieves a new delta update related to the hardware resources associated with the plurality of virtualization elements. The computing system pushes data in the new delta update to the configuration management database.

In some embodiments, the computing system pushing the data in the new delta update to the configuration management database includes updating the first database with the data contained in the new delta update and causing the data contained in the new delta update to be translated and included in the configuration management database.

In some embodiments, a non-transitory computer readable medium is disclosed herein. The non-transitory computer readable medium includes one or more sequences of instructions, which, when executed by one or more processors, causes a computing system to perform operations. The operations include identifying, by the computing system, a plurality of virtualization elements executing on a cloud computing environment. The operations further include retrieving, by the computing system, a first set of data related to software resources executing across the plurality of virtualization elements. The operations further include retrieving, by the computing system, a second set of data related to hardware resources associated with the plurality of virtualization elements. The operations further include retrieving, by the computing system, delta updates to the first set of data, wherein the delta updates are retrieved in real-time. The operations further include generating, by the computing system, a first database comprising the first set of data related to the software resources, the second set of data related to the hardware resources associated with the plurality of virtualization elements, and the delta updates. The operations further include generating, by the computing system, a configuration management database hosted by a configuration management database system to present information associated with the first database by causing a representation of the first database to exist within the configuration management database system and causing the representation to be translated into a configuration management database format compatible with the configuration management database system.

In some embodiments, the operations further include interfacing, by the computing system, with one or more streaming data platforms to present the information associated with the first database to one or more end users.

In some embodiments, interfacing, by the computing system, with the configuration management database system to present information associated with the first database includes establishing a connection between the computing system and the configuration management database system via a Java database connectivity (JDBC) connection.

In some embodiments, retrieving, by the computing system, the first set of data related to software resources executing across the plurality of virtualization elements includes periodically pulling software package data from the software resources executing across the plurality of virtualization elements.

In some embodiments, generating, by the computing system, the first database includes filtering the first set of data related to the software resources to include information requested by a user.

In some embodiments, the operations further include retrieving, by the computing system, a new delta update related to the hardware resources associated with the plurality of virtualization elements. The operations further include pushing, by the computing system, data in the new delta update to the configuration management database.

In some embodiments, pushing, by the computing system, the data in the new delta update to the configuration management database includes updating the first database with the data contained in the new delta update and causing the data contained in the new delta update to be translated and included in the configuration management database.

In some embodiments, a system is disclosed herein. The system includes a processor and a memory. The memory has programming instructions stored thereon, which, when executed by the processor, causes the system to perform operations. The operations include identifying a plurality of virtualization elements executing on a cloud computing environment. The operations further include retrieving a first set of data related to software resources executing across the plurality of virtualization elements. The operations further include retrieving a second set of data related to hardware resources associated with the plurality of virtualization elements. The operations further include retrieving delta updates to the first set of data, wherein the delta updates are retrieved in real-time. The operations further include generating a first database that includes the first set of data related to the software resources, the second set of data related to the hardware resources associated with the plurality of virtualization elements, and the delta updates. The operations further include generating a configuration management database hosted by a configuration management database system to present information associated with the first database by causing a representation of the first database to exist within the configuration management database system and causing the representation to be translated into a configuration management database format compatible with the configuration management database system.

In some embodiments, the operations further include interfacing with one or more streaming data platforms to present the information associated with the first database to one or more end users.

In some embodiments, interfacing with the configuration management database system to present information associated with the first database includes establishing a connection between the system and the configuration management database system via a Java database connectivity (JDBC) connection.

In some embodiments, retrieving the first set of data related to software resources executing across the plurality of virtualization elements includes periodically pulling software package data from software resources executing across the plurality of virtualization elements.

In some embodiments, generating the first database includes filtering the first set of data related to the software resources to include information requested by a user.

In some embodiments the operations further include retrieving a new delta update related to the hardware resources associated with the plurality of virtualization elements and pushing data in the new delta update to the configuration management database by updating the first database with the data contained in the new delta update and causing the data contained in the new delta update to be translated and included in the configuration management database.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A configuration management database may refer to a database used by an organization to store information about hardware and software assets. In the enterprise context, the number of hardware and software assets may have the tendency to grow exponentially for a given service. For example, an enterprise may have a set of hardware and software assets for supporting deployment of a mobile application. In some embodiments, these hardware and software assets may be representative of one or more virtualization elements, such as virtual machines and/or containers executing in a cloud environment. Conventional configuration management database systems or, more specifically, conventional enterprise conventional configuration management database systems, fail to provide an inventory of hardware and software assets executing on a cloud environment. As such, conventional systems are unable to provide developers or administrators with a mapping of hardware and software assets to particular services provided by the enterprise.

One or more techniques described herein improve upon conventional configuration management database systems by providing a mechanism that is able to manage hardware and software assets associated with the enterprise. In this manner, a developer or administrator may be able to easily view asset information for a particular enterprise service.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
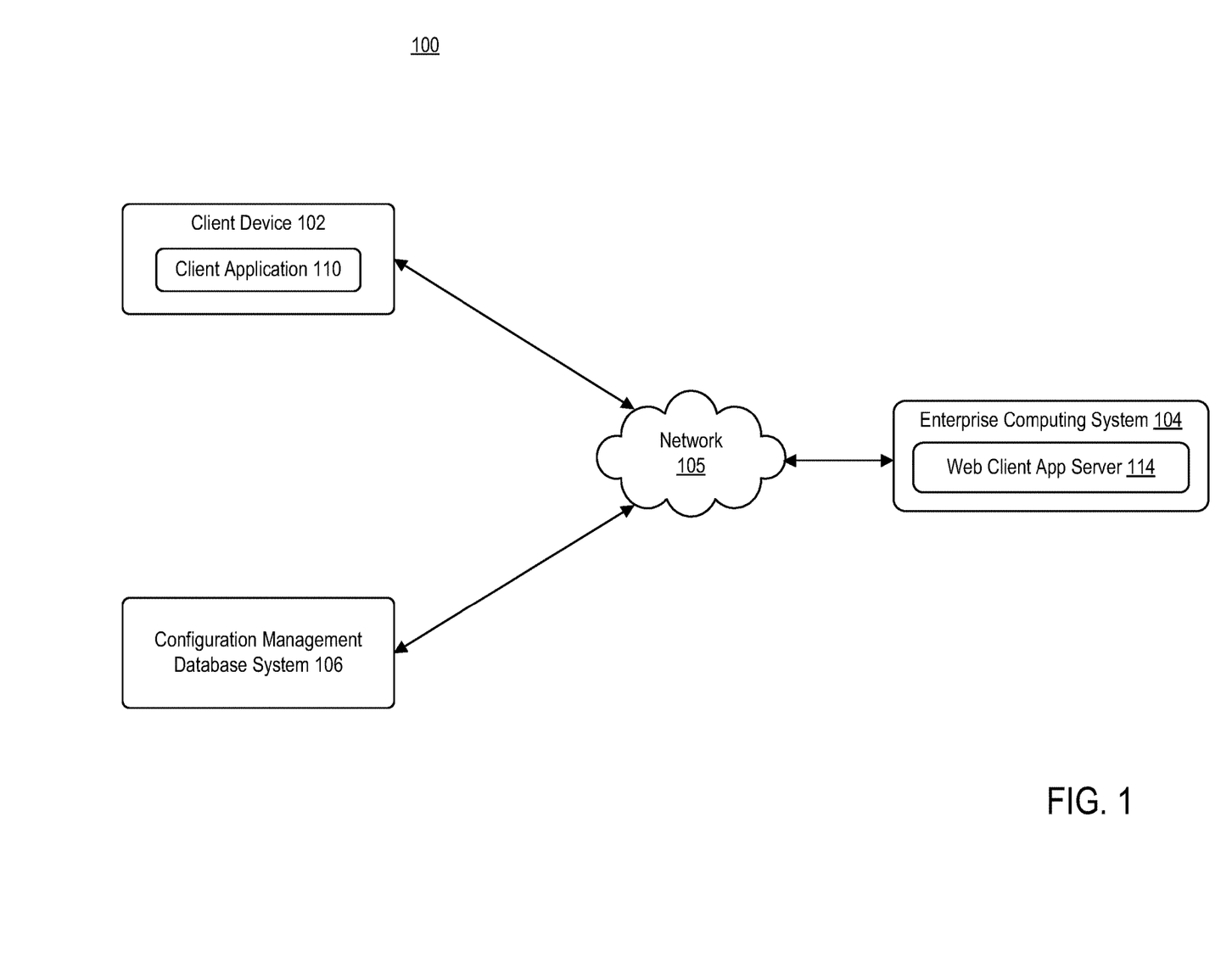
FIG. 1 is a block diagram illustrating a computing environment, according to one exemplary embodiment.

FIG. 1 is a block diagram illustrating a computing environment 100, according to one embodiment. Computing environment 100 may include at least a client device 102, an enterprise computing system 104, and a configuration management database system 106 communicating via network 105.

Network 105 may be representative of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data. For example, network 105 may be representative of the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having the capabilities described herein. Client device 102 may include a client application 110. Client application 110 may be representative of an application executing on client device 102. Client application 110 may allow a user of client device 102 to access functionality of enterprise computing system 104. For example, via client application 110, a user of client device 102 may view information regarding the hardware and software assets associated with a service offering from enterprise computing system 104.

Client application 110 may be representative of a web browser that allows access to a website or a stand-alone application. Client device 102 may communicate over network 105 to request a webpage, for example, from web client application server 114 of enterprise computing system 104. For example, client device 102 may be configured to execute application 110 to access content managed by enterprise computing system 104. The content that is displayed to client device 102 may be transmitted from web client application server 114 to client device 102, and subsequently processed by application 110 for display through a graphical user interface (GUI) of client device 102.

Enterprise computing system 104 may be configured to manage hardware and software assets associated with the enterprise. For example, enterprise computing system 104 may be representative of a plurality of servers configured to host a plurality of virtualization elements associated with the enterprise. In some embodiments, the plurality of virtualization elements may be configured to execute or support various service offerings provided by the enterprise. Enterprise computing system 104 may include various data processing tiers configured to dynamically consume data related to the hardware and software assets and process the data to generate reports based off information associated with the hardware and software assets. Users of client device 102 may access the reports via client application 110 executing thereon.

In some embodiments, enterprise computing system 104 may communicate with configuration management database system 106. Configuration management database system 106 may be representative of a third party configuration management database system, such as ServiceNow, that allows end users to generate and analyze reports about the various hardware and software assets associated with the enterprise. In some embodiments, a user of client device 102 may access the reports via client application 110 executing thereon.

Figure 2:
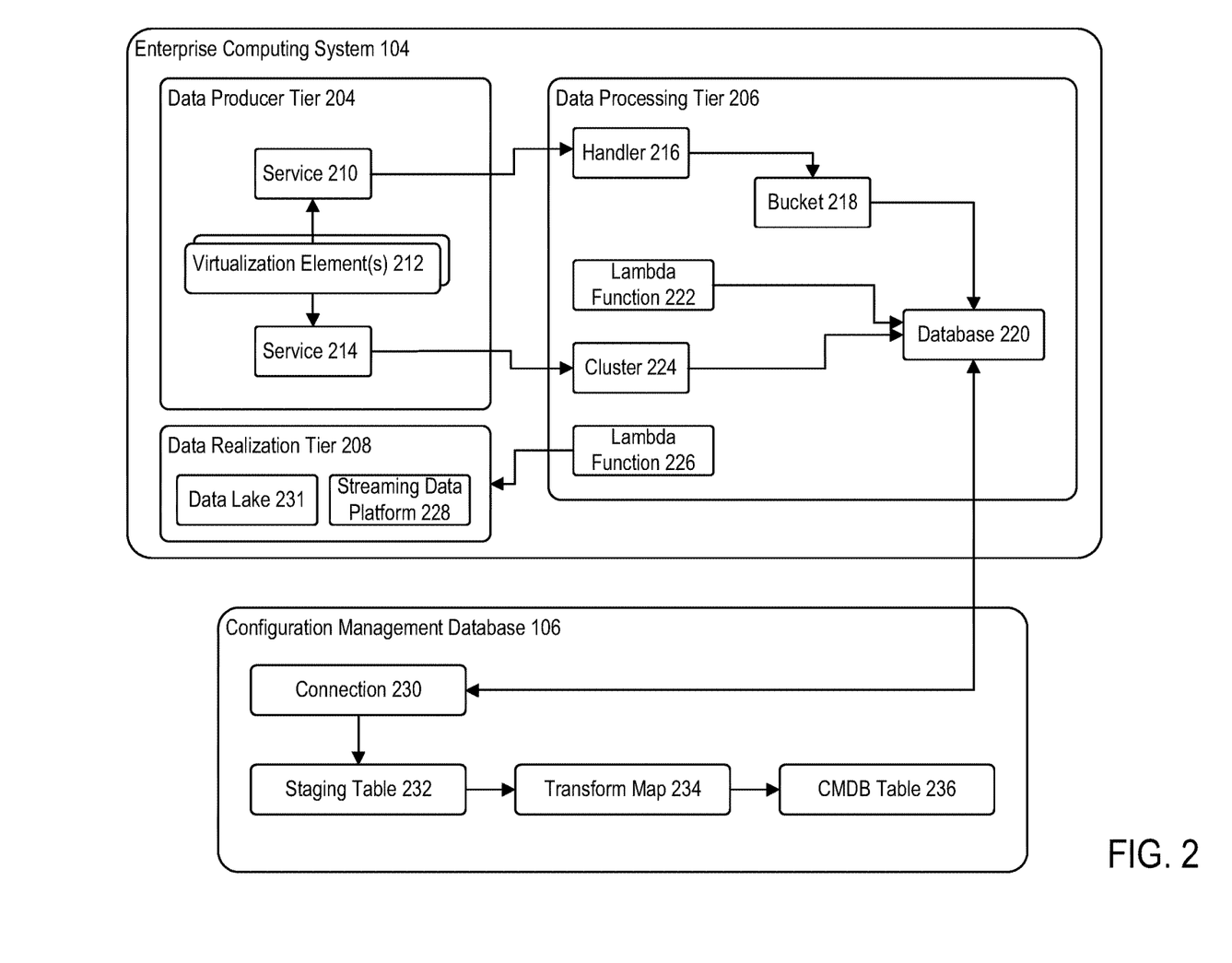
FIG. 2 is a block diagram illustrating back end computing system, according to example embodiments.

FIG. 2 is a block diagram illustrating enterprise computing system 104, according to example embodiments.

In some embodiments, enterprise computing system 104 may be representative one or more server computers associated with an enterprise or organization. In some embodiments, the one or more server computers may not be located or controlled by the enterprise. For example, one or more server computers may be representative of one or more server computers associated with a cloud computing provider, such as, but not limited to Amazon Web Services, Microsoft Azure, Google Cloud Platform, VMware Cloud, and the like.

As shown, enterprise computing system 104 may include data producer tier 204, data processing tier 206, and data realization tier 208. Each of data producer tier 204, data processing tier 206, and data realization tier 208 may be comprised of one or more software modules. The one or more software modules may be collections of code or instructions stored on a media (e.g., memory associated with enterprise computing system 104) that represent a series of machine instructions (e.g., program code) that implements one or more algorithmic steps. Such machine instructions may be the actual computer code a processor associated with enterprise computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Data producer tier 204 may be configured to retrieve or generate data related to the various hardware and/or software assets associated with enterprise computing system 104. As shown, data producer tier 204 may include one or more virtualization elements 212. Each of the virtualization elements 212 may correspond to one of a virtual machine or container provisioned by an enterprise computing system 104. Service 210 may be configured to retrieve and/or store information associated with the hardware assets associated with enterprise computing system 104. For example, for each virtualization element 212 (e.g., each EC2 instance), service 210 may gather and store information corresponding to the underlying hardware assets. Exemplary underlying hardware assets may include a number of CPUs and/or memory allocated to each virtualization element 212, configuration information, tags associated with each virtualization element 212, and the like.

In some embodiments, exemplary hardware resources that may be tracked include, but is not limited to, one or more of: ARN, availability zone, virtualization element account ID, virtualization element region, AMI launch index, configuration architecture, block device mappings, cap reserve spec, cap reserve preference, CPU options, core count, threads per core, elastic block store (EBS) optimized, elastic GPU, elastic inference accelerator associations, hibernation options, hypervisor, image ID, instance ID, instance type, launch time, licenses, monitoring state, network interfaces, availability zone, tenancy, private DNS name, private IP address, product codes, root device name, root device type, security groups, source destination check, state code, state name, subnet ID, tags, virtualization type, VPCLD, capture time, item status, item version, state ID, related events, relationships, creation time, resource ID, resource type, virtualization element-test, client token, ENA support, instance profile, instance profile ID, key name, platform, state reason code, state reason message, state transition reason, ASV, tags app name, application, virtualization element account, BA tag, BAP tag, CM DB environment, CM DB environment BAP, component tag, cost center tag, creator tag, IAM policy key, instance name tag, owner contact tag, owner name, autoscaling group name, cloud formation logical ID, cloud formation stack ID, cloud formation stack name, virtualization element launch template ID, virtualization element launch template version, and the like.

Service 214 may be configured to retrieve or gather data related to software assets associated with enterprise computing system 104. In some embodiments, each virtualization element 212 may include an agent installed thereon. For example, the agent may be installed on the virtualization image corresponding to each virtualization element. As such, when a virtualization element 212 is provisioned with a corresponding virtualization image, the agent may be configured to execute thereon. Each agent may stream software package information for each virtualization element 212 into service 214. In some embodiments, the agent may be representative of one or more of OSQuery and/or NXlog. Exemplary software data may include, but is not limited to software package name, version vendor information, and the like.

In this manner, data producer tier 204 may include a first service—service 210—configured to manage hardware resource information related to hardware resources associated with virtualization elements 212, and a second service—service 214—configured to manage software resource information related to software resources executing across virtualization elements 212.

Data processing tier 206 may be configured to process the hardware resource information and the software resource information produced by data producer tier 204. As shown, data processing tier 206 may include a handler 216, a data bucket 218, a first lambda function 222, a cluster 224, a second lambda function 226, and a database 220.

Handler 216 may be configured to communicate with service 210. For example, handler 216 may be configured to receive hardware resource information from service 210. In some embodiments, handler 216 may be configured to parse the hardware resource information based on resource type and their associated attribute. For example, handler 216 may parse the hardware resource information based on cloud-based resources (e.g., AWS resources) to identify data captured by a specific resource. Handler 216 may provide the parsed data to data bucket 218 and/or database 220. For example, data bucket 218 may be representative of a local data bucket (e.g., local to data processing tier 206). Data bucket 218 may be configured to store a local copy of the parsed hardware resource data. In some embodiments, handler 216 may be configured to pull or retrieve data from service 210 on a periodical basis. For example, handler 216 may be configured to pull or retrieve data from service 210 on a daily basis.

Lambda function 222 may be configured to receive, retrieve, or pull hardware resource information from service 210. In some embodiments, lambda function 222 may be configured to parse the hardware resource information based on resource type and their associated attribute. Lambda function 222 may provide the parsed data to database 220. In some embodiments, handler 216 may be configured to pull or retrieve data from service 210 on a more frequent basis than handler 216. For example, lambda function 222 may be configured to pull or retrieve data from service 210 on an hourly basis, while handler 216 may pull or retrieve data on a daily basis. In some embodiments, lambda function 222 may be configured to pull or retrieve data from service 210 in real-time or near real-time.

Cluster 224 may be configured to receive, retrieve, or pull software resource information from service 214. For example, cluster 224 may be representative of a container orchestration service that may manage virtualization elements 212. In some embodiments, cluster 224 may be representative of a cluster of containers configured to retrieve and process software resource information from service 214. Using a specific example, cluster 224 may be representative of Amazon's Elastic Container Service (ECS) cluster. In some embodiments, cluster 224 may be configured to parse the software resource information based on resource type and their associated attribute. For example, cluster 224 may parse data received from NXLog, specific to container data, to identify relationship between container and the host it runs on. Cluster 224 may provide the parsed data to database 220. In some embodiments, cluster 224 may be configured to pull or retrieve data from service 214 on a periodical basis. For example, cluster 224 may be configured to pull or retrieve data from service 214 on a daily basis. In some embodiments, cluster 224 may be configured to pull or retrieve data from service 214 on a more frequent basis (e.g., hourly).

Database 220 may be configured to store hardware resource information and software resource information. For example, database 220 may be configured to store daily hardware resource information, hourly or more frequent resource information (i.e., delta updates), and software resource information. In some embodiments, database 220 may be representative of a MySQL database accessible to one or more of data realization tier 208 and configuration management database system 106.

Data realization tier 208 may be configured to provide users (e.g., user of client device 102) with access to information stored in database 220. As shown, data realization tier 208 may include a streaming data platform 228 and a data lake 231. Streaming data platform 228 may be configured to receive hardware resource information and software resource information from database 220 for storage in data lake 231. For example, lambda function 226 of data processing tier 206 may stream hardware resource data and software resource data to streaming data platform 228. Once in data lake 231, a user may have access to the hardware resource information and the software resource information via one or more application programming interfaces (APIs) or a software development kit (SDK).

As shown, database 220 may also be available to configuration management database system 106. Configuration management database system 106 may include a connection 230, a staging table 232, a transform map 234, and a configuration management database (CMDB) table 236. Connection 230 may be configured to provide a connection between data processing tier 206 and configuration management database system 106. In some embodiments, connection 230 may be representative of a management, instrumentation, and discovery (MID) server. In some embodiments, connection 230 may be representative of a Java database connectivity (JDBC) connection, native to configuration management database system 106.

Staging table 232 may be configured to store information from database 220. For example, following ingestion of hardware resource information and software resource information from database 220, via connection 230, connection 230 may store the hardware resource information and software resource information in staging table 232. Staging table 232 may be thought of as a temporary table containing the information stored in database 220.

Transform map 234 may be configured to map or transform the data contained in staging table 232 into one or more CMDB tables 236. For example, transform map 234 may match columns from staging table 232 to columns in one or more CMDB tables 236. Transform map 234 may be configured to import external data into configuration management database system 106. For example, configuration management database system 106 may include a feature that allows a user to create a JDBC connection to an external data source (e.g., database 220). Processed or transformed data may be stored or otherwise made available to users of client device 102 via CMDB table 236. In this manner, users can access the data to generate various reports regarding hardware and software resource allocation for various enterprise services.

Figure 3:
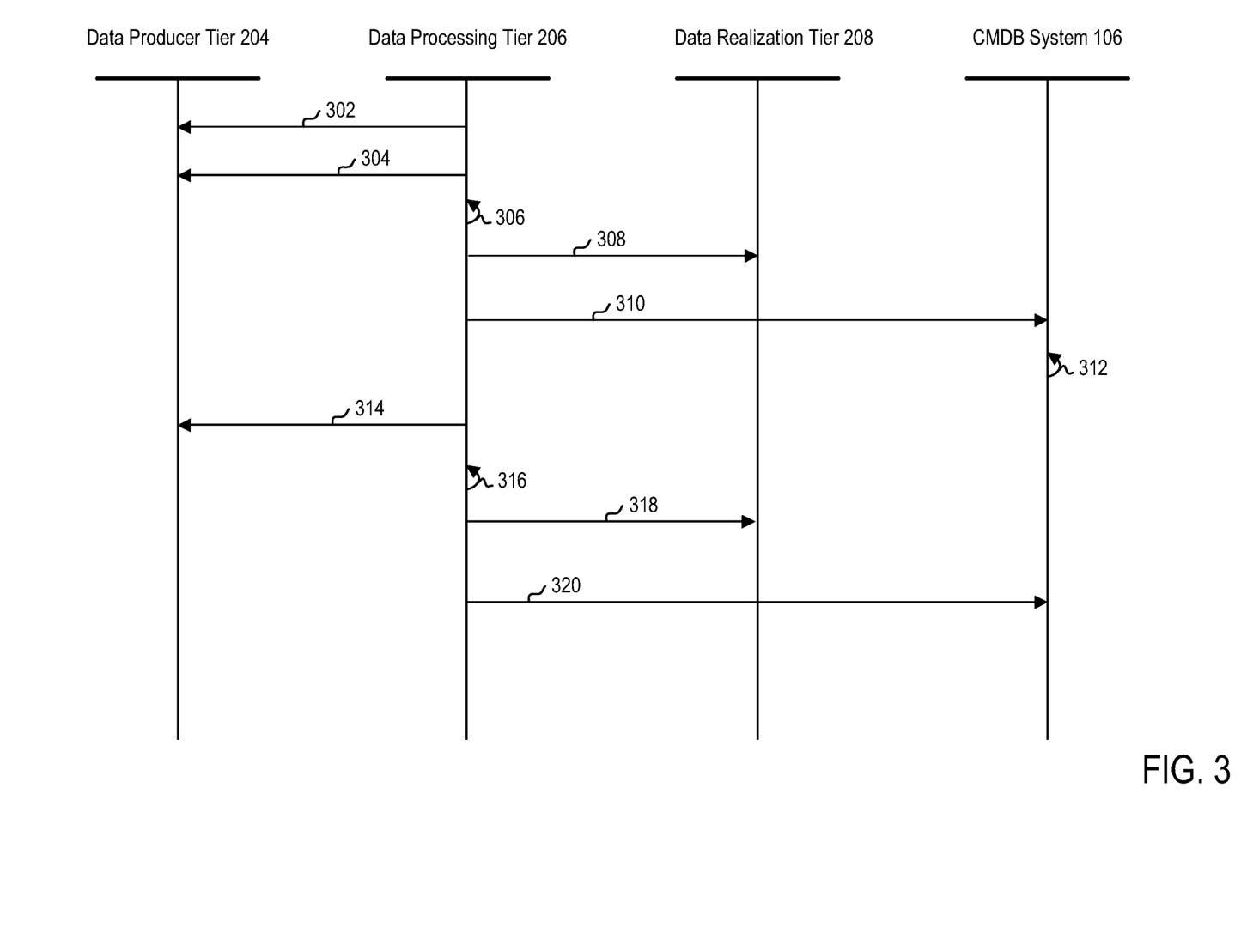
FIG. 3 is a block diagram illustrating submission environment of back end computing system, according to example embodiments.

FIG. 3 is a block diagram illustrating communication among components of enterprise computing system 104 and configuration management database system 106, according to example embodiments.

At block 302, data processing tier 206 may retrieve or pull hardware resource data from data producer tier 204. For example, data processing tier 206 may retrieve or pull hardware resource data from service 210 of data producer tier 204. Service 210 is configured to manage hardware resource information related to hardware resources associated with virtualization elements 212 of data producer tier 204.

At bock 304, data processing tier 206 may retrieve or pull software resource data from data producer tier 204. For example, data processing tier 206 may retrieve or pull software resource data from service 214 of data producer tier 204. Service 214 is configured to manage software resource information related to software resources associated with virtualization elements of data producer tier 204. In some embodiments, data processing tier 206 may retrieve or pull software resource data from data producer tier 204 daily.

At block 306, data processing tier 206 may be configured to process the hardware resource information and the software resource information produced by data producer tier 204. In some embodiments, handler 216 may parse the hardware resource information based on resource type and their associated attribute. Handler 216 may provide the parsed data to data bucket 218 and/or database 220. In some embodiments, cluster 224 may parse the software resource information based on resource type and their associated attribute. Cluster 224 may provide the parsed data to database 220. In some embodiments, cluster 224 may be configured to pull or retrieve data from service 214 on a periodical basis.

At block 308, data processing tier 206 may provide or stream hardware resource data and software resource data to streaming data platform 228. Once in data lake 231, a user may have access to the hardware resource information and the software resource information via one or more application programming interfaces (APIs) or a software development kit (SDK).

At block 310, data processing tier 206 may provide or stream hardware resource data and software resource data to configuration management database system 106. For example, data processing tier 206 may provide configuration management database system 106 with access to the hardware resource data and the software resource data via connection 230.

At block 312, configuration management database system 106 may process the received hardware resource data and the software resource data. For example, configuration management database system 106 may store the hardware resource data and the software resource data in a CMDB table 236, native to configuration management database system 106. To do so, configuration management database system 106 may store the hardware resource information and the software resource information in staging table 232. Transform map 234 may map or transform the data contained in staging table 232 into one or more CMDB tables 236. In this manner, processed or transformed data may be stored or otherwise made available to users of client device 102 via CMDB table 236.

At block 314, data processing tier 206 may retrieve or pull delta updates from data producer tier 204. For example, lambda function 222 may receive, retrieve, or pull hardware resource information from service 210. Lambda function 222 may pull or retrieve data from service 210 on an hourly basis, while handler 216 may pull or retrieve data on a daily basis.

At block 316, data processing tier 206 may be configured to process the delta updates produced by data producer tier 204. For example, lambda function 222 may parse the hardware resource information based on resource type and their associated attribute. Lambda function 222 may provide the parsed data to database 220.

At block 318, data processing tier 206 may provide the updated database 220 to data realization tier 208. For example, data processing tier 206 may provide or stream the delta updates to streaming data platform 228. Once in data lake 231, a user may have access to the delta updates via one or more APIs or an SDK.

At block 320, data processing tier 206 may provide or stream the delta updates to configuration management database system 106. For example, data processing tier 206 may provide configuration management database system 106 with access to the most recent hardware resource data via connection 230. In this manner, a user may be provided with both daily and hourly resource information.

Figure 4:
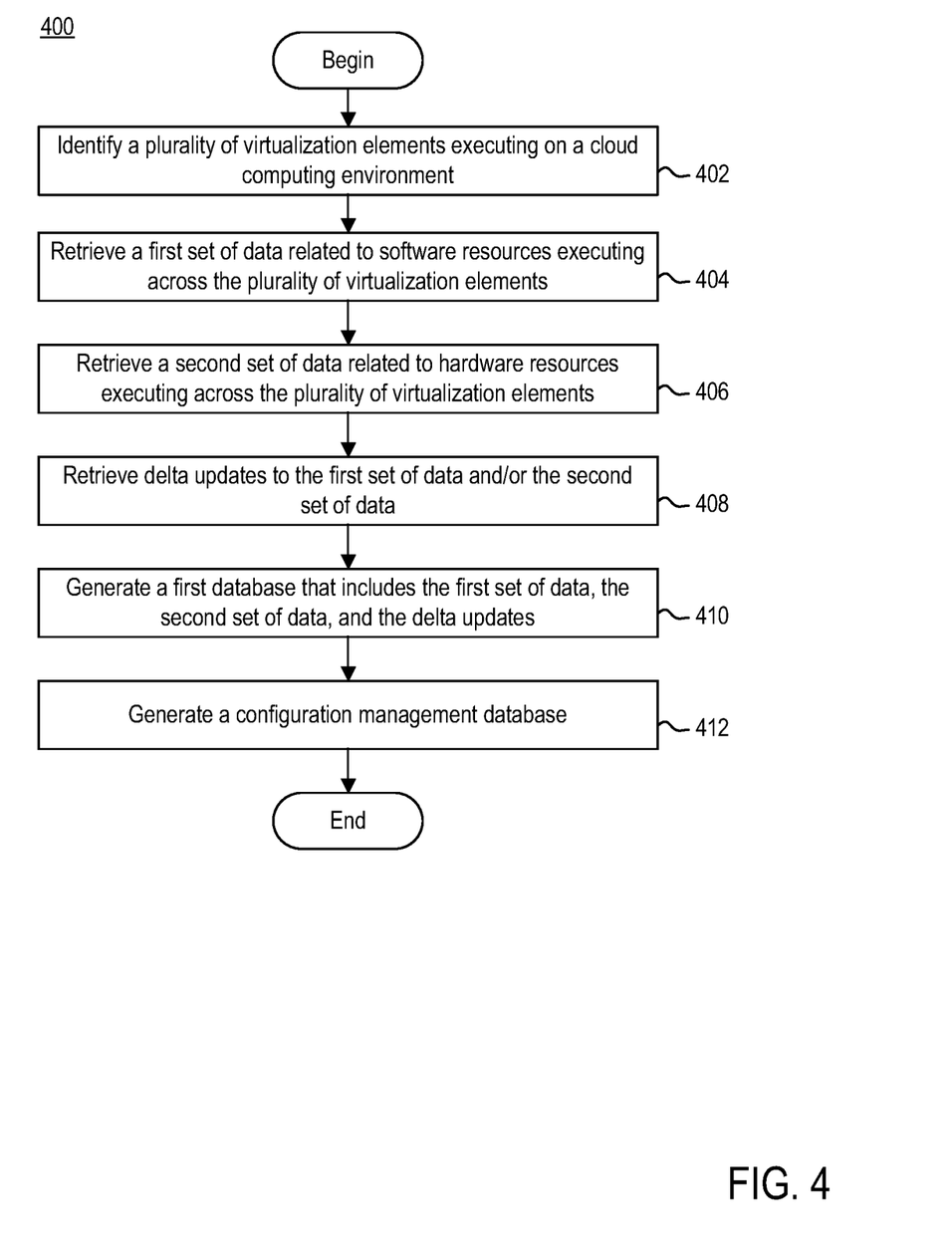
FIG. 4 is a block diagram illustrating production environment of back end computing system, according to example embodiments.

FIG. 4 is a flow diagram illustrating a method 400 for managing an enterprise computing system 104, according to example embodiments. Method 400 may begin at step 402.

At step 402, enterprise computing system 104 may identify a plurality of virtualization elements executing on a cloud computing environment. For example, data producer tier 204 may identify a plurality of virtualization elements 212 executing on a cloud computing environment. In some embodiments, the plurality of virtualization elements 212 are EC2 instances and the cloud computing environment is AWS.

At step 404, enterprise computing system 104 may retrieve a first set of data related to software resources executing across virtualization elements 212. For example, data processing tier 206 may retrieve or pull software resource data from data producer tier 204. For example, data processing tier 206 may retrieve or pull software resource data from service 214 of data producer tier 204. Service 214 is configured to manage software resource information related to software resources associated with virtualization elements of data producer tier 204. In some embodiments, data processing tier 206 may retrieve or pull software resource data from data producer tier 204 daily.

At step 406, enterprise computing system 104 may retrieve a second set of data related to hardware resources associated with virtualization elements 212. For example, data processing tier 206 may retrieve or pull hardware resource data from data producer tier 204. For example, data processing tier 206 may retrieve or pull hardware resource data from service 210 of data producer tier 204. Service 210 is configured to manage hardware resource information related to hardware resources associated with virtualization elements 212 of data producer tier 204.

At step 408, enterprise computing system 104 may retrieve delta updates for the first or second sets of data. For example, data processing tier 206 may retrieve or pull delta updates from data producer tier 204. For example, lambda function 222 may receive, retrieve, or pull hardware resource information from service 210 and/or software resource information from service 214. Lambda function 222 may pull or retrieve data from service 210 on an hourly basis, while handler 216 may pull or retrieve data on a daily basis.

At step 410, enterprise computing system 104 may generate a first database that include the first set of data, the second set of data, and the delta updates. For example, data processing tier 206 may be configured to process the hardware resource information and the software resource information produced by data producer tier 204. In some embodiments, handler 216 may parse the hardware resource information based on resource type and their associated attribute. Handler 216 may provide the parsed data to data bucket 218 and/or database 220. In some embodiments, cluster 224 may parse the software resource information based on resource type and their associated attribute. Cluster 224 may provide the parsed data to database 220. In some embodiments, cluster 224 may be configured to pull or retrieve data from service 214 on a periodical basis.

At step 412, enterprise computing system 104 may generate a configuration management database. For example, data processing tier 206 may provide or stream hardware resource data and software resource data to configuration management database system 106. For example, data processing tier 206 may provide configuration management database system 106 with access to the hardware resource data and the software resource data via connection 230. Providing or streaming hardware resource data and software resource data to configuration management database system 106 may cause configuration management database system 106 to store the hardware resource data and the software resource data in a CMDB table 236, native to configuration management database system 106. For example, enterprise computing system 104 may cause configuration management database system 106 to store the hardware resource information and the software resource information in staging table 232. Transform map 234 may map or transform the data contained in staging table 232 into one or more CMDB tables 236. In this manner, data processing tier 206 may cause the processed or transformed data to be stored or otherwise made available to users of client device 102 via CMDB table 236.

Figure 5A:
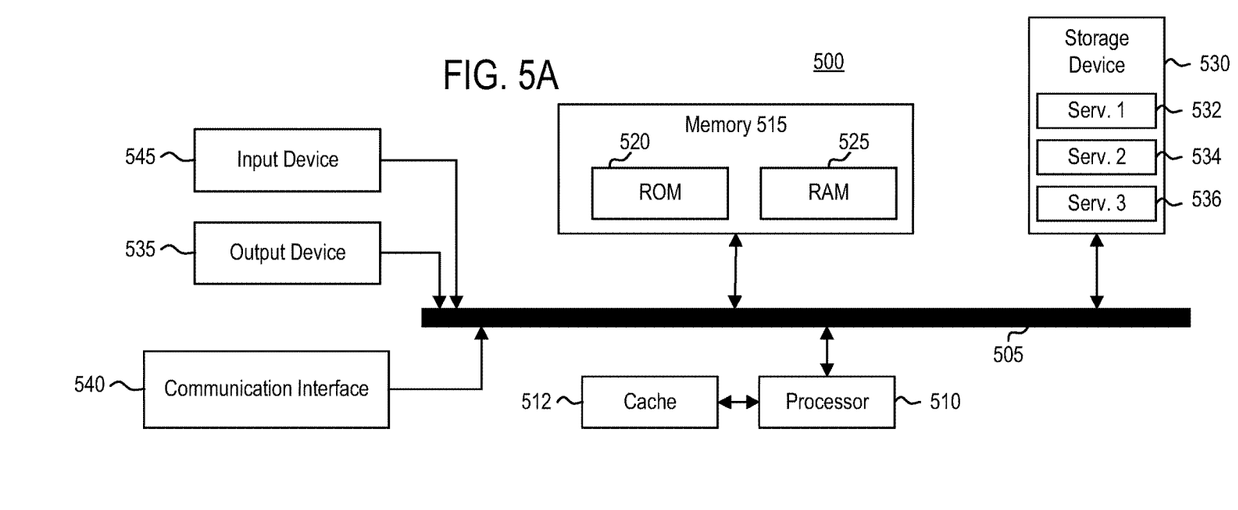
FIG. 5A illustrates an architecture of system bus computing system, according to example embodiments.

FIG. 5A illustrates an architecture of system bus computing system 500, according to example embodiments. One or more components of system 500 may be in electrical communication with each other using a bus 505. System 500 may include a processor (e.g., one or more CPUs, GPUs or other types of processors) 510 and a system bus 505 that couples various system components including the system memory 515, such as read only memory (ROM) 520 and random access memory (RAM) 525, to processor 510. System 500 can include a cache of high-speed memory connected directly with, in close proximity to, or integrated as part of processor 510. System 500 can copy data from memory 515 and/or storage device 530 to cache 512 for quick access by processor 510. In this way, cache 512 may provide a performance boost that avoids processor 510 delays while waiting for data. These and other modules can control or be configured to control processor 510 to perform various actions. Other system memory 515 may be available for use as well. Memory 515 may include multiple different types of memory with different performance characteristics. Processor 510 may be representative of a single processor or multiple processors. Processor 510 can include one or more of a general purpose processor or a hardware module or software module, such as service 1 532, service 2 534, and service 3 536 stored in storage device 530, configured to control processor 510, as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction with the system 500, an input device 545 which can be any number of input mechanisms, such as a microphone for speech, a touch-sensitive screen for gesture or graphical input, keyboard, mouse, motion input, speech and so forth. An output device 535 (e.g., a display) can also be one or more of a number of output mechanisms known to those of skill in the art. In some instances, multimodal systems can enable a user to provide multiple types of input to communicate with system 500. Communications interface 540 can generally govern and manage the user input and system output. There is no restriction on operating on any particular hardware arrangement and therefore the basic features here may easily be substituted for improved hardware or firmware arrangements as they are developed.

Storage device 530 may be a non-volatile memory and can be a hard disk or other types of computer readable media that can store data that are accessible by a computer, such as magnetic cassettes, flash memory cards, solid state memory devices, digital versatile disks, cartridges, random access memories (RAMs) 525, read only memory (ROM) 520, and hybrids thereof.

Storage device 530 can include services 532, 534, and 536 for controlling the processor 510. Other hardware or software modules are contemplated. Storage device 530 can be connected to system bus 505. In one aspect, a hardware module that performs a particular function can include the software component stored in a computer-readable medium in connection with the necessary hardware components, such as processor 510, bus 505, output device 535 (e.g., a display), and so forth, to carry out the function.

Figure 5B:
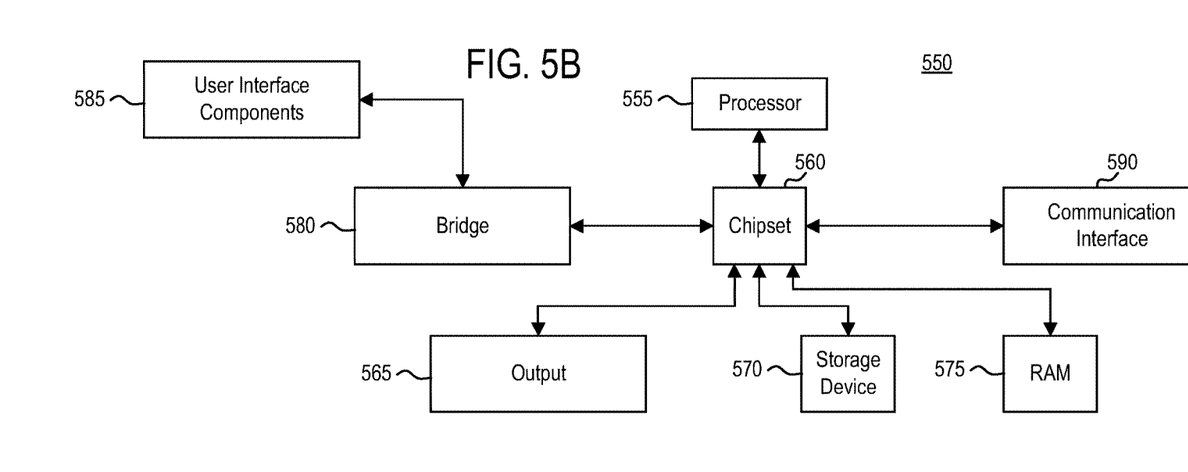
FIG. 5B illustrates a computer system having a chipset architecture, according to example embodiments.

FIG. 5B illustrates a computer system 550 having a chipset architecture, according to example embodiments. Computer system 550 may be an example of computer hardware, software, and firmware that can be used to implement the disclosed technology. System 550 can include one or more processors 555, representative of any number of physically and/or logically distinct resources capable of executing software, firmware, and hardware configured to perform identified computations. One or more processors 555 can communicate with a chipset 560 that can control input to and output from one or more processors 555. In this example, chipset 560 outputs information to output 565, such as a display, and can read and write information to storage device 570, which can include magnetic media, and solid-state media, for example. Chipset 560 can also read data from and write data to storage device 575 (e.g., RAM). A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by one or more processors 555 analyzing data stored in storage device 570 or 575. Further, the machine can receive inputs from a user through user interface components 585 and execute appropriate functions, such as browsing functions by interpreting these inputs using one or more processors 555.

It can be appreciated that example systems 500 and 550 can have more than one processor 510 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method comprising:
   identifying, by a computing system, a plurality of virtualization elements executing on a cloud computing environment, the plurality of virtualization elements comprising one or more of a plurality of containers or a plurality of virtual machines;
   retrieving, by the computing system, a first set of data related to software resources executing across the plurality of containers or the plurality of virtual machines;
   retrieving, by the computing system, a second set of data related to hardware resources allocated to the plurality of virtualization elements;
   retrieving, by the computing system, delta updates to the first set of data, wherein the delta updates are retrieved in real-time;
   generating, by the computing system, a first database comprising the first set of data related to the software resources, the second set of data related to the hardware resources associated with the plurality of virtualization elements, and the delta updates;
   transmitting the first set of data, the second set of data, and the delta updates to a data lake separate from the first database,
      wherein the delta updates are transmitted to the data lake in real-time, and
      wherein the data lake is user-accessible through one or more application programming interfaces; and
   generating, by the computing system, a configuration management database separate from the first database and the data lake, the configuration management database hosted by a configuration management database system to present information associated with the first database by:
      causing a representation of the first database to exist within the configuration management database system in a form of a staging table, and
      causing the representation to be translated via a transform map from the staging table into a configuration management database format compatible with the configuration management database system.

2. The method of claim 1, further comprising:
   interfacing, by the computing system, with one or more streaming data platforms to present the information associated with the data lake to one or more end users.

3. The method of claim 1, wherein interfacing, by the computing system, with the configuration management database system to present information associated with the first database comprises:
   establishing a connection between the computing system and the configuration management database system via a Java database connectivity (JDBC) connection.

4. The method of claim 1, wherein retrieving, by the computing system, the first set of data related to software resources executing across the plurality of virtualization elements comprises:
   periodically pulling software package data from the software resources executing across the plurality of virtualization elements.

5. The method of claim 1, wherein generating, by the computing system, the first database comprises:
   filtering the first set of data related to the software resources to include information requested by a user.

6. The method of claim 1, further comprising:
   retrieving, by the computing system, a new delta update related to the hardware resources associated with the plurality of virtualization elements; and
   pushing, by the computing system, data in the new delta update to the configuration management database.

7. The method of claim 6, wherein pushing, by the computing system, the data in the new delta update to the configuration management database comprises:
   updating the first database with the data contained in the new delta update; and
   causing the data contained in the new delta update to be translated and included in the configuration management database.

8. A non-transitory computer readable medium comprising one or more sequences of instructions, which, when executed by one or more processors, causes a computing system to perform operations comprising:
   identifying, by the computing system, a plurality of virtualization elements executing on a cloud computing environment, the plurality of virtualization elements comprising one or more of a plurality of containers or a plurality of virtual machines;
   retrieving, by the computing system, a first set of data related to software resources executing across the plurality of containers or the plurality of virtual machines;
   retrieving, by the computing system, a second set of data related to hardware resources allocated to the plurality of virtualization elements;
   retrieving, by the computing system, delta updates to the first set of data, wherein the delta updates are retrieved in real-time;
   generating, by the computing system, a first database comprising the first set of data related to the software resources, the second set of data related to the hardware resources associated with the plurality of virtualization elements, and the delta updates;
   transmitting the first set of data, the second set of data, and the delta updates to a data lake separate from the first database,
      wherein the delta updates are transmitted to the data lake in real-time, and
      wherein the data lake is user-accessible through one or more application programming interfaces; and
   generating, by the computing system, a configuration management database separate from the first database and the data lake, the configuration management database hosted by a configuration management database system to present information associated with the first database by:
      causing a representation of the first database to exist within the configuration management database system in a form of a staging table, and
      causing the representation to be translated via a transform map from the staging table into a configuration management database format compatible with the configuration management database system.

9. The non-transitory computer readable medium of claim 8, further comprising:
   interfacing, by the computing system, with one or more streaming data platforms to present the information associated with the data lake to one or more end users.

10. The non-transitory computer readable medium of claim 8, wherein interfacing, by the computing system, with the configuration management database system to present information associated with the first database comprises:
   establishing a connection between the computing system and the configuration management database system via a Java database connectivity (JDBC) connection.

11. The non-transitory computer readable medium of claim 8, wherein retrieving, by the computing system, the first set of data related to software resources executing across the plurality of virtualization elements comprises:
   periodically pulling software package data from the software resources executing across the plurality of virtualization elements.

12. The non-transitory computer readable medium of claim 8, wherein generating, by the computing system, the first database comprises:
   filtering the first set of data related to the software resources to include information requested by a user.

13. The non-transitory computer readable medium of claim 8, further comprising:
   retrieving, by the computing system, a new delta update related to the hardware resources associated with the plurality of virtualization elements; and
   pushing, by the computing system, data in the new delta update to the configuration management database.

14. The non-transitory computer readable medium of claim 13, wherein pushing, by the computing system, the data in the new delta update to the configuration management database comprises:
   updating the first database with the data contained in the new delta update; and
   causing the data contained in the new delta update to be translated and included in the configuration management database.

15. A system, comprising:
   a processor; and
   a memory having programming instructions stored thereon, which, when executed by the processor, causes the system to perform operations, comprising:
   identifying a plurality of virtualization elements executing on a cloud computing environment, the plurality of virtualization elements comprising one or more of a plurality of containers or a plurality of virtual machines;
   retrieving a first set of data related to software resources executing across the plurality of containers or the plurality of virtual machines;
   retrieving a second set of data related to hardware resources allocated to the plurality of virtualization elements;
   retrieving delta updates to the first set of data, wherein the delta updates are retrieved in real-time;
   generating a first database comprising the first set of data related to the software resources, the second set of data related to the hardware resources associated with the plurality of virtualization elements, and the delta updates;
   transmitting the first set of data, the second set of data, and the delta updates to a data lake separate from the first database,
      wherein the delta updates are transmitted to the data lake in real-time, and
      wherein the data lake is user-accessible through one or more application programming interfaces; and
   generating a configuration management database separate from the first database and the data lake, the configuration management database hosted by a configuration management database system to present information associated with the first database by:
      causing a representation of the first database to exist within the configuration management database system in a form of a staging table, and
      causing the representation to be translated via a transform map from the staging table into a configuration management database format compatible with the configuration management database system.

16. The system of claim 15, wherein the operations further comprise:
   interfacing with one or more streaming data platforms to present the information associated with the data lake to one or more end users.

17. The system of claim 15, wherein interfacing with the configuration management database system to present information associated with the first database comprises:

establishing a connection between the system and the configuration management database system via a Java database connectivity (JDBC) connection.

18. The system of claim 15, wherein retrieving the first set of data related to software resources executing across the plurality of virtualization elements comprises:
periodically pulling software package data from software resources executing across the plurality of virtualization elements.

19. The system of claim 15, wherein generating the first database comprises:
filtering the first set of data related to the software resources to include information requested by a user.

20. The system of claim 15, wherein the operations further comprise:
retrieving a new delta update related to the hardware resources associated with the plurality of virtualization elements; and
pushing data in the new delta update to the configuration management database by:
updating the first database with the data contained in the new delta update; and
causing the data contained in the new delta update to be translated and included in the configuration management database.

* * * * *